Sept. 25, 1962 C. O. SLEMMONS 3,055,182
STABILIZER FOR FENDER BUFFER SYSTEM
Filed Aug. 8, 1956 3 Sheets-Sheet 1
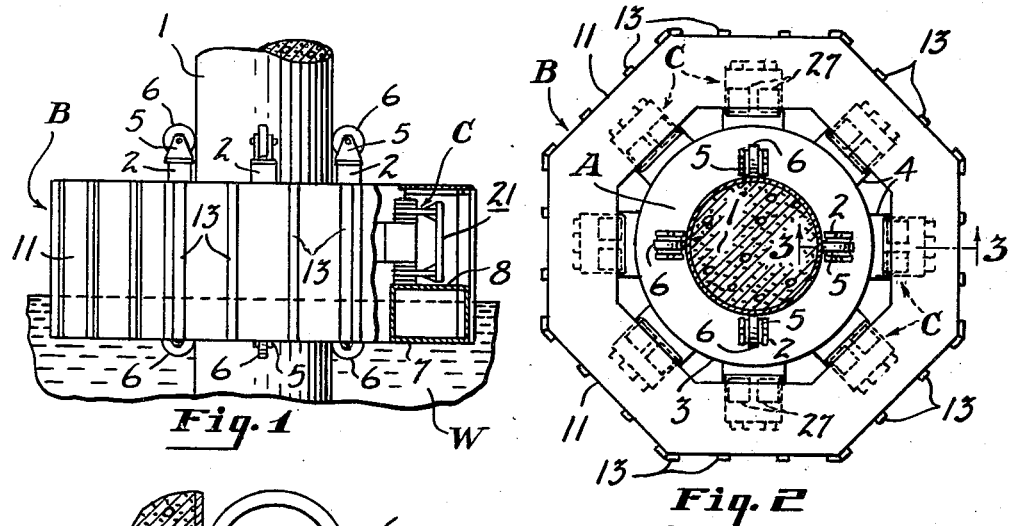
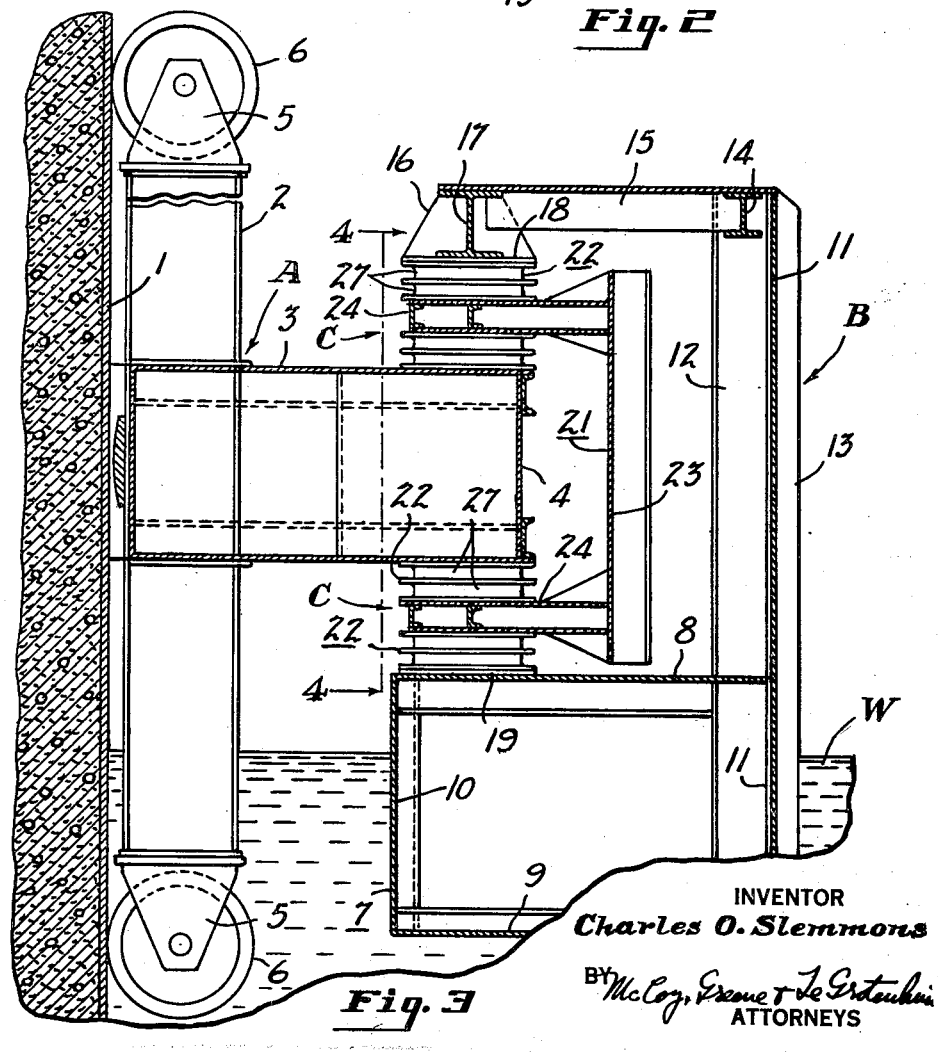
INVENTOR
*Charles O. Slemmons*
BY
ATTORNEYS Sept. 25, 1962 C. O. SLEMMONS 3,055,182
STABILIZER FOR FENDER BUFFER SYSTEM
Filed Aug. 8, 1956 3 Sheets-Sheet 2

INVENTOR
Charles O. Slemmons
BY
ATTORNEYS

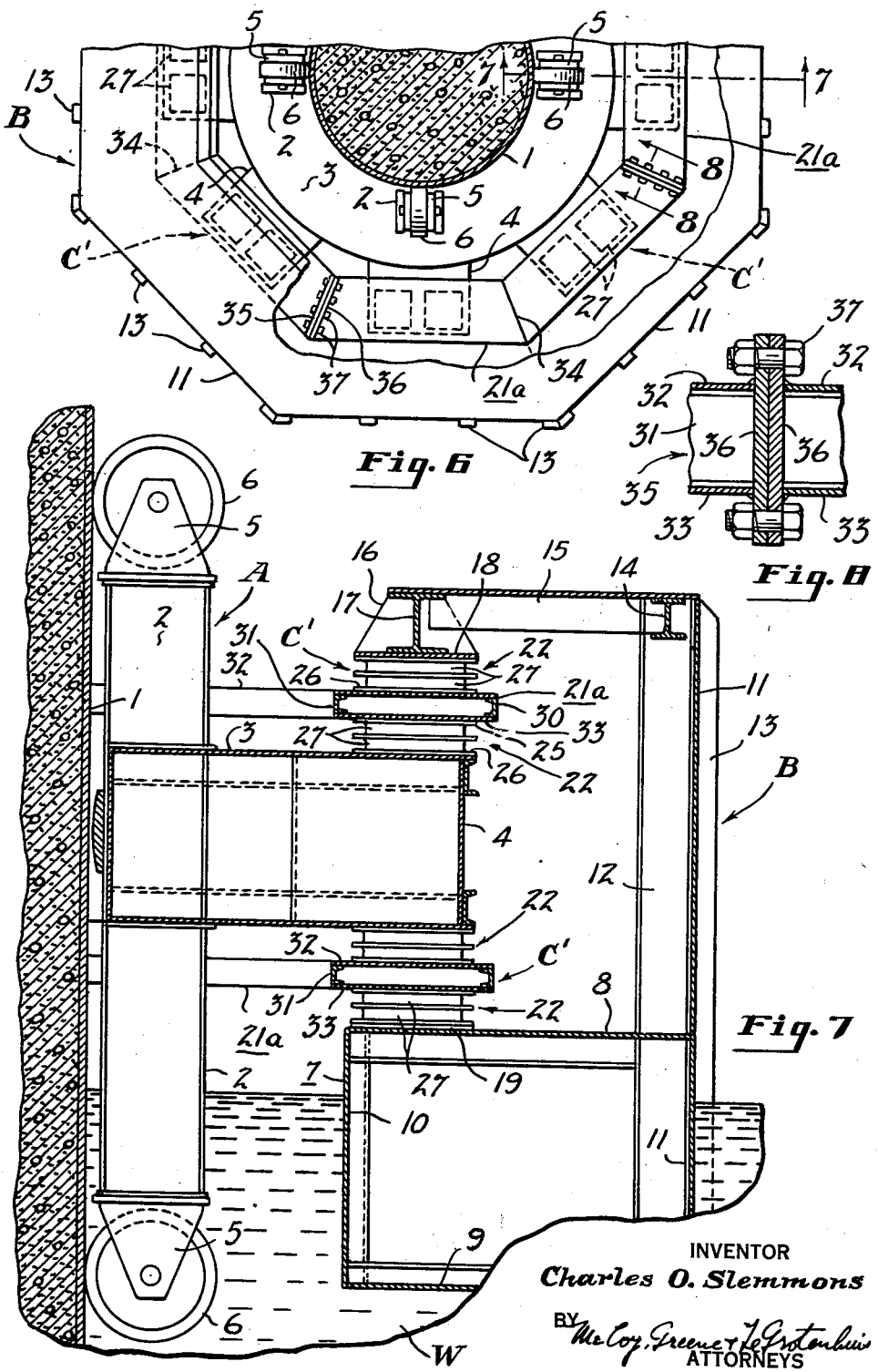

3,055,182
STABILIZER FOR FENDER BUFFER SYSTEM
Charles O. Slemmons, Akron, Ohio, assignor to The General Tire & Rubber Company, Akron, Ohio, a corporation of Ohio
Filed Aug. 8, 1956, Ser. No. 602,747
2 Claims. (Cl. 61—48)

The present invention relates to improvements in fender buffers for wharves, piers, "Texas towers" and the like and more particularly to a stabilizer for a fender buffer system employing rubber sandwiches.

It has been found that excellent fender buffers may be provided using rubber sandwiches comprising a series of rubber layers with metal plates interposed between adjacent layers. With such an arrangement the shocks are taken up by the rubber in shear. However, under extreme conditions the intermediate plates, supported solely by the rubber, tend to move out of parallel relation with the other metal plates so that the rubber layers are subjected to tension, which tends to damage the unit. The present invention provides a means for avoiding this difficulty.

The fender buffer of the present invention comprises an inner rigid metal frame and an outer rigid metal frame movable relative to each other, a plurality of spaced resilient cushioning units interposed between the two frames yieldably to resist relative movement of the frames out of a predetermined neutral position, and means connecting portions of circumferentially spaced cushioning units and spaced from the frames to stabilize said units. Each cushioning unit includes a pair of rubber sandwiches comprising at least two rubber layers and metal plates bonded to the upper and lower faces of each layer whereby the intermediate metal plates are free to move relative to the inner and outer frames.

A rigid circumferentially extending stabilizer is connected between the intermediate plates of circumferentially widely spaced cushioning units so that said intermediate plates do not swing or turn substantially relative to their normal planes of movement when the rubber layers are subjected to high shear stresses. The circumferentially extending stabilizers are connected to the intermediate plates of different cushioning units which plates tend to swing in different directions so that the forces tending to swing the intermediate plate of one cushioning unit tend to resist the forces tending to swing the intermediate plate of the other cushioning unit.

An object of the present invention is to provide an improved fender buffer for wharves, piers or the like, which is simple and inexpensive to manufacture and which is efficient and durable in use.

A further object of the invention is to stabilize the movement of metal plates in the rubber sandwiches of fender buffers so that the rubber layers are subjected to a minimum amount of tension, and a maximum amount of shear under a given load.

Other objects, uses and advantages of the present invention will become apparent to those skilled in the art from the following description and claims and from the drawings in which:

FIGURE 1 is a fragmentary elevational view on a reduced scale with parts broken away and shown in vertical cross section of a fender buffer system according to the present invention;

FIGURE 2 is a top plan view on a reduced scale showing the fender buffer system of FIG. 1;

FIGURE 3 is a fragmentary vertical sectional view taken substantially along the line 3—3 of FIG. 2 and on a larger scale, portions being broken away and shown in section;

FIGURE 6 is a fragmentary top plan view similar to FIG. 2 and on a larger scale with parts broken away and parts omitted showing a modified form of the invention;

FIGURE 7 is a fragmentary vertical sectional view taken substantially along the line 7—7 of FIG. 6 and on a larger scale; and FIGURE 8 is a fragmentary vertical sectional view taken substantially on the line 8—8 of FIG. 6 and on a larger scale to show one of the joints of the polygonal stabilizer.

Figure 4:
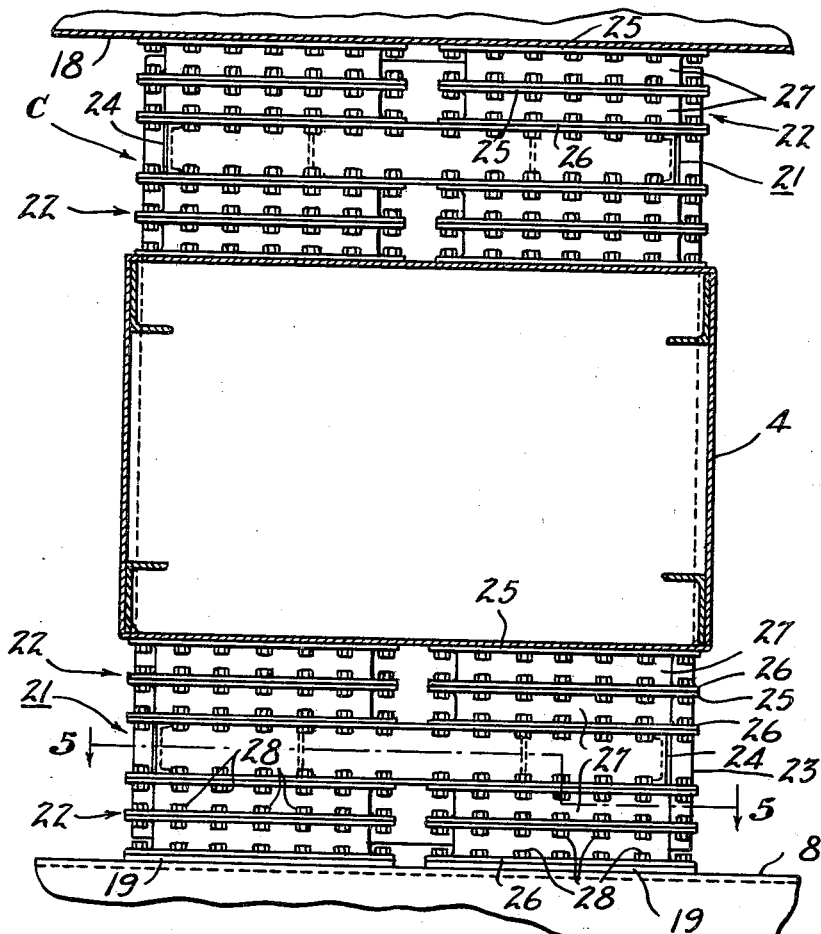
FIGURE 4 is a fragmentary vertical sectional view taken substantially on the line indicated at 4—4 in FIG. 3 and on a larger scale with parts omitted to show the cushioning unit of the present invention.

Referring more particularly to the drawings, in which like parts are identified by the same numeral throughout the several views, FIGS. 1 to 5 show a fender buffer system of the type used on so-called "Texas towers" comprising an inner rigid metal frame A, which moves vertically over the cylindrical vertical post 1 on the tower, an outer rigid metal frame B surrounding the inner frame, and a series of regularly spaced resilient cushioning units C interposed between the frames yieldably to resist movement thereof toward and away from each other, the stationary post 1 being submerged in the water and anchored in the ground and the fender buffer floating on the surface of the water W. "Texas towers" are used extensively as radar islands and also for off shore oil wells and comprise platforms supported above the water by posts which may be similar to the post 1 described herein.

The inner frame A includes rigid vertical metal standards 2, rigid annular portions 3 surrounding the post and rigidly connected to said standards, and radially extending portions 4 rigidly connected to the portions 3. The vertical portions 2 and the radially extending portions 4 are regularly circumferentially spaced as best shown in FIG. 2.

Vertical trapezoidal flanges or ears 5 are provided at the top and bottom ends of the standards 2 to provide supports for cylindrical rollers 6 which engage the post 1. The rollers 6 are mounted for rotation about horizontal axes which are parallel to lines through the circumferential surface of the rollers and tangent to the post 1. The rollers 6 are located so as to prevent tilting of the frame A relative to the post 1 as is apparent from the drawings while permitting movement of the frame parallel to the vertical axis of the post.

The outer frame B includes a pontoon or float 7 of octagonal shape having a rectangular vertical cross section throughout its periphery as indicated in FIG. 3. The pontoon has eight straight sections having flat walls and includes a flat, horizontal, octagonal wall 8, a bottom wall 9 of the same shape as the wall 8 and parallel thereto, an inner vertical octagonal wall 10 having a center at the axis of the post 1, and an outer vertical octagonal wall 11 concentric to the wall 10. The outer wall 11 extends vertically above the top plate 8 and is reinforced by vertical steel beams 12 as shown in FIG. 3, a series of circumferentially spaced vertical timbers 13 being mounted on the wall 11 to provide a wooden facing therefor.

The rigid frame B has a top portion 15 which may be formed by steel beams and flat metal plates welded to the I-beams 14 which extend around the periphery of the frame. The inner top portion of the frame B includes perpendicular vertical plates 16 and I-beams 17 extending around the inner periphery of the frame parallel to the beams 14. A horizontal connecting plate 18 of octagonal form is welded to the bottom of the beam 17 and extends around the periphery of the frame. A similar plate 19 is located directly below the plate 18 and is welded to the top wall 8 of the float 7. The plates 18 and 19 and the remainder of the outer frame B are of octagonal shape as indicated in FIG. 3 and extend around the post 1 and the annular portion 3 of the inner frame A. The pontoon 7 is water tight and is submerged in the water W so as to support the entire assembly A—B—C. Waves, therefore, cause the assembly to move up and down along the post 1, the rollers 6 permitting such movement and holding the assembly against twisting movement relative to the post. Brakes may be provided on the frame portions 2 to stop the vertical movement on the post 1 when desired.

Cushioning units C, including rigid metal stabilizers 21 and pairs of rubber sandwiches 22, are mounted between the radial portions 4 of the inner frame and the plates 18 and 19 of the outer frame to resist relative movement between the frames A and B out of their normal positions as indicated in FIGS. 1 to 3. It will be noted that the radial portions 4 are regularly spaced about the circumference of the inner frame with their centers 45 degrees apart so that each frame portion 4 is perpendicular to the straight section of the regular octagonal outer frame B as shown in FIG. 2. Two cushioning units C are provided for each of the radially extending frame portions 4, such cushioning units being mounted on the top and bottom of each portion 4 as shown in FIG. 3.

One stabilizer 21 is provided for each vertically aligned pair of cushioning units C, each stabilizer having a vertical portion 23 and two horizontal projecting portions 24 rigidly connected to the vertical portion, such portions being formed from metal plates reinforced with cold-rolled metal channels or beams, for example as shown in the drawings. Each of the rubber sandwiches comprises two layers of elastic rubber, each having metal plates bonded to the top and bottom surfaces thereof. A flat rectangular top plate 25 and a flat rectangular bottom plate 26 are vulcanized to the parallel flat top and bottom surfaces of each rubber layer 27. The bottom plate 26 of the upper rubber layer 27 is rigidly connected by means of bolts 28 to the upper plate 25 of the lower rubber layer 27. The uppermost plate 25 of the upper units C are rigidly connected to the plate 18 by the bolts 28 and the lower plate 26 of said unit is rigidly connected to the flat top plate of the portion 4 by the bolts 28, as best shown in FIG. 4. The flat horizontal top and bottom plates of each stabilizer portion 24 are rigidly connected to the plates 25 and 26 of adjacent sandwiches 22 by the bolts 28.

The units C below the radial portions 4 of the inner frame are exactly the same as the unit C above said portions 4 except that the uppermost plate 25 of each cell C is bolted to a portion 4. The lowermost plate 26 is bolted to the plate 19. All of the cells C, therefore, function in the same manner. The operation of the fender buffer system of the present invention will be apparent from the drawings. If a boat should strike the wooden facing strips 13 at one side of the post 1 to move the porion of the outer frame B engaging the boat toward the post 1, such movement would be resisted by the cushioning units C around the periphery of the post. If the force were excessive so as to deform the rubber layers 27 materially, a substantial force would be applied to each of the stabilizer portions 24 by the rubber sandwiches 22 tending to swing said portion about a horizontal axis. However, the force applied by the sandwiches to one portion 24 of a stabilizer 21 would be directed in a direction opposite to the force acting on the other portion 24 of the stabilizer.

Figure 5:
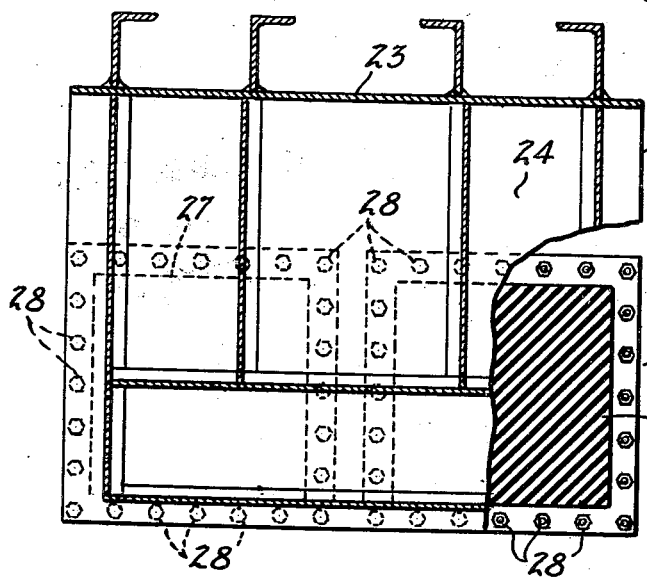
FIGURE 5 is a horizontal sectional view taken substantially along the line indicated at 5—5 in FIG. 4 and on the same scale, with parts omitted and parts broken away to show the cushioning unit of FIG. 4.

If the portions 24 were disconnected they would, therefore, move out of their horizontal parallel positions shown in FIG. 3. However, since these portions are rigidly connected by the vertical portions 23 they cannot move out of parallel relation. They, therefore, remain substantially horizontal regardless of the force applied to the cushioning units since the net force tending to move them out of the horizontal position is substantially zero where the four layers 27 of each cushioning unit C are of the same uniform thickness as shown in the drawings. The cushioning units may be constructed exactly as shown in FIGS. 4 and 5 which are drawn substantially to scale, and which form a part of this disclosure.

It will be noted that the structure is very strong due to the rolled steel angles and channels employed, and the strong steel plates. The fender buffer system of the type shown herein may easily be constructed to withstand the inertia of ships of 20,000 tons or more moving at a speed of a few feet per second so as to withstand the thrust of a moored ship due to tides, currents and wind forces. The total deflection of the cushioning units C is determined by the thickness and the number of rubber sandwiches employed, the durometer hardness of the rubber and other factors. Each of the layers 27 is preferably formed of elastic rubber of high quality and high tensile strength having a durometer hardness between 40 and 80 and preferably around 60. The layers 22 are in the form of substantial square blocks of uniform thickness as shown herein but may have other shape provided they absorb most of the shock loads under shear. As herein shown the layers 27 of one cushioning unit C are parallel to each other and to the layers 27 of the unit C directly below. However, it will be understood that arrangements of the type shown in United States Patent No. 2,655,005 may also be used so that the layers are also subjected to comprehensive force.

It will be noted that the movements of the intermediate metal plates of each cushioning unit C are stabilized by connecting them to the intermediate plates of another unit C which are moving in the same horizontal direction, but which are subjected to twisting forces acting in a direction tending to stabilize the intermediate metal plates of such first mentioned unit.

In FIGURES 1 to 5 the intermediate metal plates of each unit C which can move relative to the inner and outer frames A and B are connected to the corresponding intermediate metal plates of the unit C directly below, but it will be apparent that a similar stabilizing effect can be obtained by connecting such intermediate plates with the plates of other cushioning units.

FIGURES 6, 7 and 8 show a modified form of fender buffer according to the present invention which is exactly the same as the fender buffer of FIGS. 1 to 5 except that the eight stabilizing members 21 are replaced by two octagonal stabilizing members 21a. Each stabilizing member 21a has a peripheral inner steel channel 31 of octagonal form extending parallel to the channel 30 and concentric to the post 1. Flat horizontal top and bottom steel plates 32 and 33 are welded to the top and bottom flanges of the channels 30 and 31. Each stabilizer 21a may be made in annular form or may be circumferentially continuous, but since they are very large in order to fit around the inner frame A, it is preferable to form each stabilizer 21a in separate parts which may be bolted together. As herein shown each stabilizer 21a is formed from four identical sections, each section having two straight perpendicular portions joined by welding to form a joint 34, the opposite ends of each section being welded to flat vertical plates 36 of an adjacent section and is rigidly connected to that plate by bolts 37 as shown in FIGS. 6 and 8.

The top and bottom surfaces of each stabilizer 21a are octagonal like the plates 18 and 19. Each stabilizer 21a may be rigidly connected to the metal plates 25 and 26 of the adjacent rubber sandwiches 22 by welding or by bolts like the bolts 28. The cushioning units C' of FIGS. 6 to 8 are similar to the cushioning units C described above. The rubber sandwiches of the units C' are connected to the plates 32 and 33 of the stabilizer 21a rather than to the top and bottom plates of the stabilizer 21.

The stabilizing action of the polygonal members 21a is similar to that of the stabilizer 21. It will be noted that the forces acting on the intermediate metal plates of diagonally opposed cushioning units C' below the inner frame portions 4 move such intermediate plates in different radial directions relative to the post 1 and that the forces on said intermediate plates on opposite sides of the post tending to twist the plates about a horizontal axis are in opposite directions and tend to cancel each other out so that the net force tending to move the stabilizing unit 21a out of a horizontal position is negligible. It will be apparent why each stabilizing member 21a remains parallel to the plates 18 and 19 and to the top and bottom faces of the portions 4.

The stabilizers 21a are located above and below the radial portions 4 of the inner frame. Each stabilizer is yieldably supported between the radial portion 4 and the plate 18 or 19 of the outer frame by the resilient cushioning sandwiches of the cushioning units C'.

It is to be understood that in accordance with the provisions of the patent statutes, variations and modifications of the specific device disclosed herein may be made without departing from the spirit of the present invention.

Having described my invention, I claim:

1. In a fendering arrangement having a stationary post rigidly mounted in the ground and partially submerged in water, the combination of a rigid inner frame extending around said post, means for guiding the frame vertically on the post, a rigid floating outer frame extending around said inner frame, one of said frames having a series of circumferentially spaced connecting portions which extend radially between pairs of connecting plates carried by the other of said frames, a pair of rigid stabilizing members extending circumferentially around said inner frame, one above and the other below said radial connecting portions, a series of circumferentially spaced resilient cushioning sandwiches above and below each of said stabilizing members, said sandwiches joining each of said connecting portions to said stabilizing members and said connecting plates to provide a yieldable connection between the inner and outer frames to support the inner frame from the outer frame, each of said sandwiches comprising at least two substantially parallel elastic rubber bodies, each of which has upper and lower surface areas bonded to surface areas of metal members, the bonded surfaces being positioned substantially in planes transverse to the axis of said post so as to subject the rubber to shear when the outer frame is moved horizontally.

2. In a fendering arrangement for wharves, piers or the like, the combination of a stationary vertical post, a first horizontal rigid inner frame extending around the post from one side to the other thereof and having flat, parallel upper and lower surfaces, a second rigid outer frame extending around the post from one side to the other and having flat surfaces above and below said first frame opposed to, spaced from, and parallel to said first-named surfaces and movable relative to said first frame in a horizontal direction generally parallel to said surfaces, a pair of rigid stabilizing members extending circumferentially around said inner frame, one above and the other below said first frame, each stabilizing member being located between the opposed flat surfaces of the inner and outer frames, resilient cushioning sandwiches above and below each stabilizing member and joining it to the opposing flat surfaces of the inner and outer frames to provide a yieldable connection between the frame members, each of said sandwiches comprising flat rigid plates and elastic rubber bodies bonded thereto and arranged in superposed relation, each of said elastic rubber bodies having flat parallel surface areas on opposite sides thereof bonded to surface areas of a pair of said flat rigid plates, the bonded surfaces being positioned parallel to the intermediate member of that cushioning unit and to said flat surfaces of said first and second frame members to subject the rubber to shear when one frame member is moved relative to the other frame member in a direction generally parallel to said flat surfaces.

References Cited in the file of this patent
UNITED STATES PATENTS 2,165,702     Hausenhalter _____ July 11, 1939

FOREIGN PATENTS 725,965     Germany _____ Oct. 3, 1942
648,516     Great Britain _____ Jan. 3, 1951